Aug. 28, 1934.　　　G. T. COOKE　　　1,971,770
GREASE CUP
Filed Feb. 27, 1933
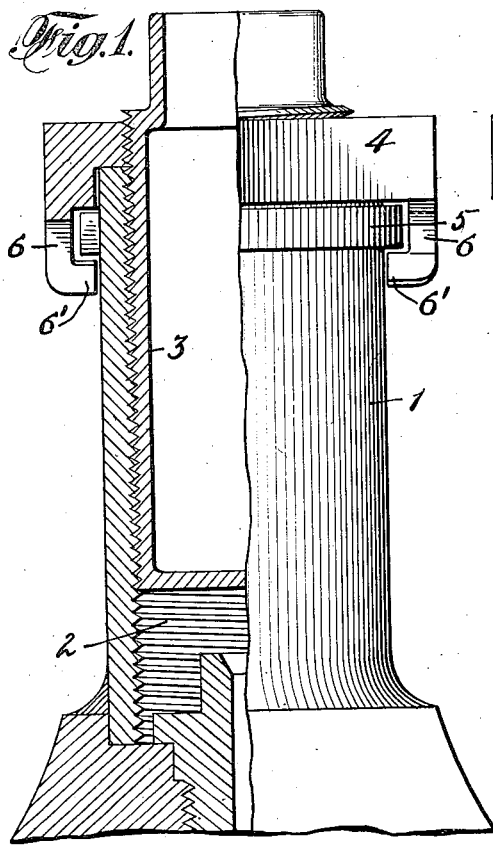
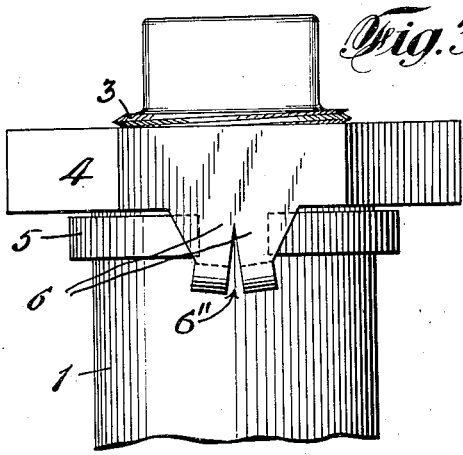
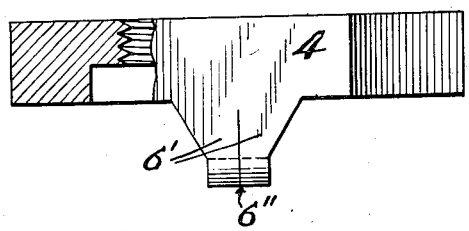
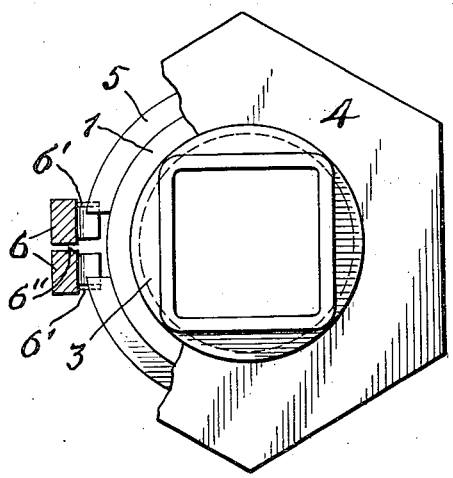
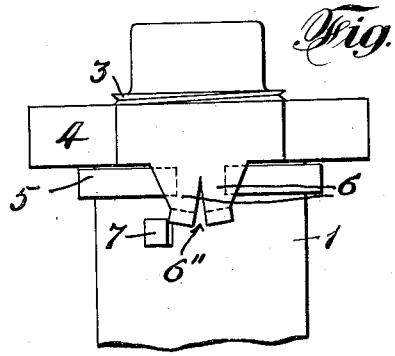
INVENTOR
George T. Cooke,
BY
Mitchell Bechert
ATTORNEYS Patented Aug. 28, 1934

1,971,770

UNITED STATES PATENT OFFICE 1,971,770

GREASE CUP

George T. Cooke, South Norwalk, Conn.

Application February 27, 1933, Serial No. 658,674

13 Claims. (Cl. 184—38)

This invention relates to safety devices which are particularly applicable to grease cups such as are employed on locomotive driving rods for the purpose of lubricating the bearings therefor. It is in connection with such a use that I shall show and describe the invention, although I wish to have it understood that its use is not limited thereto. In ordinary practice grease cups designed for this use are provided with plugs that may be screwed in so as to force grease therefrom and into the bearings. In the ordinary construction these plugs frequently work out and are lost, due to the extreme vibration to which such parts are subjected in use. This loss not only invites the danger of overheated bearings, but involves a substantial replacement expense that should be avoided.

The main objects of my invention is to provide an efficient means which will prevent these plugs from accidentally working out and becoming lost and which itself cannot become accidentally detached and lost.

In the accompanying drawing—

Fig. 1 is a side elevation partly broken away and in section;

Fig. 2 is a plan view also partly broken away and in section;

Fig. 3 is a side elevation of the upper portion of the parts shown in Fig. 1, taken at a right angle thereto;

Fig. 4 is a side elevation of a nut before assembly with the other parts and partly broken away;

Fig. 5 is a side elevation of a modification.

In the drawing I have shown only certain preferred forms of my invention.

1 represents a tubular body which forms the grease cup. The lower end of the body 1 is firmly secured in any desired way to the bearing to be lubricated. At the lower end of the cup is an outlet or passage to permit the grease contents to be forced to the bearing proper. The internal wall of the body 1 is provided with a thread 2. The means for forcing the grease into the bearing comprises a follower, preferably in the form of a plug 3, the outside of which is threaded to screw into the internally threaded portion of the body 1. The outer end of the plug 3 is usually shaped to receive a wrench, whereby it may be turned. 4 is a check nut, the passage through which is threaded to correspond with the thread on the outer side of the plug 3. By preference the fit of the threaded portions of the nut and plug is somewhat closer than the thread fit between the plug and the grease cup. I provide means for securing the nut 4 to the grease cup 1, so that it cannot become accidentally detached therefrom and lost, whether or not the plug is present.

In the particular form shown in Fig. 1 the under side of the nut 4 is counterbored, so that the lower edge of the nut will fit down around the outer end of the cup body 1, as shown. This prevents lateral displacement of the nut. On the outside of the body 1 and just below the nut is an annular flange 5, which is interrupted at two or more points. At suitable intervals around the nut and on the lower side thereof there are two or more depending keeper lugs 6—6. The lower ends of these lugs are hooked inwardly, as at 6'—6', so that when the parts are assembled the hooks will stand under the annular flange 5. These hooked keepers, as shown, connect the nut to the body against complete separation while still permitting a limited amount of end play.

It will also be noted that the keepers 6—6 are carried by and extend below the check nut 4 so as not to interfere with the turning of a wrench applied to said nut when the same is being turned up or down on the thread of the plug 3.

In assembling the nut with the body 1 the hooked ends 6'—6' are passed through the interruption in the flange 5, and each hooked end is then spread or bent so that it cannot escape through the entrance passage. This illustrates one method by which the nut may be secured to the cups.

Now, assuming the parts are assembled and the grease cup is filled with grease. The mechanic first screws the plug through the nut 4 until it engages the thread 2 on the inside of the plug. He continues to screw down on the plug until a sufficient amount of grease has been forced from the cup into the bearing. By now holding the plug 3 against turning he may turn the nut 4 down on the plug 3 until it encounters the outer end of the cup 1 and becomes jammed, thus locking the plug in place. Assuming the mechanic should fail to turn the nut down tightly enough, or assuming he should entirely forget to turn it down, when the plug 3 tends to work back by reason of the vibration it will carry with it the nut 4, until the slight clearance between the hooked ends 6'—6' and the flange 5 is taken up, whereupon the hooked ends 6'—6' will encounter the flange 5 and become jammed therewith, thus locking the plug against outward movement. Even if the plug should be turned in so far that its threads leave the nut, the latter will still remain in place on the body of the cup and block the escape of the plug.

From the foregoing it will be seen that under all conditions absolute safety is guaranteed against accidental loss of grease cup plugs or the safety nuts therefor.

Various means may be provided for so connecting the nut 4 to the cup body 1, so that it may have only a limited longitudinal movement thereon, and cannot accidentally escape and become lost. In the particular form shown the lower ends of each lug 6 may be slitted, as indicated at 6'', so that when the nut is in place the lower ends of each lug may be spread sufficiently to prevent said hooked ends 6' from escape through the entrance notches in the annular flange 5.

By counterboring the under side of the nut 4 so that it fits over the outer end of the body 1, lateral strain on the lugs 6—6 is avoided, and in addition thereto it checks the escape of grease as the cup is being filled. As already pointed out this also prevents the nut from escaping laterally from the body 1 and hence relieves the keeper lugs of this duty.

In Fig. 5 I have shown a stop 7 on the side of the body 1 below the flange 5. This stop is so positioned as to stand in the path of one side of a keeper 6 before the nut 4 can become seated on the outer end of the body 1. This permits the plug 3 to be screwed freely down in a direction to force grease from the cup since the threads will not bind. If and when the plug tends to work outwardly, it will carry with it the nut 4, moving it outwardly sufficiently to permit the keepers to clear the stops 7 so that the nut can rise sufficiently to permit said keepers to encounter and bind against the underside of flange 5 in the manner characteristic of the construction shown in the other figures and so that the threads of the nut will bind the threads of the plug sufficiently to check the further outward movement of the plug. This guarantees against the escape of the plug from the cup. There may be many instances where this form will be preferred since it makes it unnecessary for the operator to hold the nut from jamming against the end of the cup while he is screwing the plug down into the cup. Since it is the primary object to check the outward movement of the plug before it becomes free of the cup, it is obvious that this construction shown in Fig. 5 accomplishes that end, as well as having the further advantage above described.

I claim:

1. A hollow body forming a grease container, an internal thread therefor, a lock nut rotatable on said body and having limited longitudinal play, a plug threaded to screw through said nut and into said hollow body, and means to hold said nut connected to said body when said plug is removed therefrom.

2. A grease cup comprising an internally threaded hollow body, a similarly threaded lock nut rotatably mounted upon one end of said body, a threaded plug adapted to screw through said nut and into said body, means carried by and movable with the nut for connecting said nut to said body while permitting limited longitudinal movement of the nut relatively thereto.

3. A grease cup, comprising a hollow body, a plug externally threaded to screw into said body, a lock nut mounted on said body and having limited longitudinal movement relatively thereto, and means independent of said plug to hold said nut connected to said body to prevent accidental separation of said nut therefrom when the plug is removed.

4. In a safety device for a grease cup, a hollow cup body, a follower threaded to screw into said cup body, means carried by said cup body and coacting with said follower to frictionally couple said follower to said cup body against escape therefrom on the outward movement of said follower, said means comprising a nut counterbored on the lower side to rotatably fit over and around the outer end of said cup body, and keeper means carried by one of said parts and engaging the other part and coacting with the wall around the counterbored portion of the nut to prevent separation of the nut from the cup body when the follower is removed but permitting limited longitudinal play.

5. A grease cup comprising a cup body, a plug threaded to screw into the outer end of said body to force grease therefrom, a nut mounted to turn on that part of said plug outside of said body, and a keeper connection between said nut and cup body and below said nut to limit the degree of separation of the last mentioned parts and check the outward movement of said plug, one part of said keeper connection being mounted on the outer side of said cup body and being stationary, the other part being carried by the lower part of said nut and hooked to engage around the first part.

6. A grease cup comprising a cup body, a plug threaded to screw into the outer end of said body to force grease therefrom, a nut mounted to turn on that part of said plug outside of said body, and a keeper connection between said nut and cup body to limit the degree of separation of the last mentioned parts and to thereby check the outward movement of said plug, said keeper connection comprising an annular flange adjacent the outer end of said cup, and a plurality of bendable hook keeper members carried by and extending downwardly from said nut and projecting underneath said flange.

7. A grease cup, comprising a cup body, a safety check nut, a plug threaded to screw through said nut and into said body, means to rotatably secure said nut to the outer end of said body and to prevent the accidental detachment of the same therefrom, said means being constructed to permit limited endwise movement of said nut relatively to said body and being carried partly by said nut and partly by said body.

8. A grease cup, comprising a cup body, an interrupted annular flange on the side of said body below the outer end thereof, a counterbored nut fitting over the outer end of said cup and against said flange, a plurality of spreadable hooks carried by said nut and engaging underneath said flange, said hooks when spread being too wide to pass through the interruptions in said flange, and a plug adapted to screw through said nut and into said cup.

9. A grease cup, comprising a cup body, a plug threaded to screw into said body to force grease therefrom, a check nut having a threaded passage for said plug, and means to secure said nut to said body to hold the same thereto independently of said plug.

10. In a device of the character described, a hollow body, a plug threaded to screw into said body, a nut at the outer end of said body, said nut having a threaded passage for said plug, means to stop the advance movement of said nut by the inward rotation of the plug before said nut will jam on said plug to thereby permit the plug to be advanced freely into said body, and means to limit the outward movement of the nut by the outward movement of the plug to cause the threaded connection between the nut and the plug to become jammed to thereby check the outward movement of the latter and prevent the accidental escape of said plug from said body.

11. In a device of the character described, a hollow body, a plug threaded to screw into said body, a nut carried by said body and having a threaded passage for said plug, means on said body to positively stop the rotation of said nut on said body in one direction when the plug is being screwed in and before said nut will bind against the end of said body, and means to bind said nut on said body after a degree of outward movement of the plug and nut to in turn bind the threaded connection between the nut and the plug to thereby check further outward movement of the latter.

12. In a grease cup, a hollow body, a follower adapted to screw into said body, a check nut having a threaded passage for said follower, means to hold said nut in a non-jamming position to permit said follower to be freely screwed through said nut and into said body, and means to hold said nut in a jamming position to check said follower on its outward movement to prevent its accidental escape from said body.

13. A grease cup, comprising a fixed cup body, a plug threaded to screw into the outer end of said body to force grease therefrom, a nut mounted to turn on said body and also on that part of said plug outside of said body, and a keeper connection on and extending downwardly from said nut to engage said cup body to hold said nut thereto while permitting a limited degree of separation therefrom to check the outward movement of said plug.

GEORGE T. COOKE.